United States Patent
Yamaguchi (10) Patent No.: US 12,257,720 B2
(45) Date of Patent: Mar. 25, 2025

(54) ROBOT CONTROL DEVICE

(71) Applicant: FANUC CORPORATION, Yamanashi (JP)

(72) Inventor: Daiki Yamaguchi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 222 days.

(21) Appl. No.: 18/001,232

(22) PCT Filed: Jul. 1, 2021

(86) PCT No.: PCT/JP2021/025033
§ 371 (c)(1),
(2) Date: Dec. 8, 2022

(87) PCT Pub. No.: WO2022/009785
PCT Pub. Date: Jan. 13, 2022

(65) Prior Publication Data
US 2023/0234227 A1 Jul. 27, 2023

(30) Foreign Application Priority Data
Jul. 7, 2020 (JP) ................................. 2020-117099

(51) Int. Cl.
*B25J 9/16* (2006.01)
(52) U.S. Cl.
CPC .................................. *B25J 9/1664* (2013.01)
(58) Field of Classification Search
None
See application file for complete search history.

(56) References Cited

U.S. PATENT DOCUMENTS

| | | | |
|---|---|---|---|
| 2005/0125100 A1* | 6/2005 | Stoddard | B25J 9/1682 700/245 |
| 2015/0045949 A1* | 2/2015 | Hashiguchi | B25J 9/161 700/264 |

(Continued)

FOREIGN PATENT DOCUMENTS

| | | |
|---|---|---|
| JP | H05-204431 A | 8/1993 |
| JP | H07-129215 A | 5/1995 |

(Continued)

OTHER PUBLICATIONS

International Search Report issued in PCT/JP2021/025033; mailed Sep. 21, 2021.

*Primary Examiner* — Jonathan L Sample
*Assistant Examiner* — Alan Lindsay Ostrow
(74) *Attorney, Agent, or Firm* — Studebaker Brackett PLLC (57) ABSTRACT

The purpose of the present invention is to eliminate the need, when a robot has been replaced with a new robot that is different in size, for an operator to directly re-input as operation program to make the robot operative. This robot control device comprises: a storage unit that stores an operation program; and a control unit that operates a robot is a robot coordinate system with three orthogonal axes. The control unit is provided with: a mobility range determination unit that determines whether there is, in the operation program, an axis, among the three orthogonal axes, that exceeds a mobility range of the robot; and a correction unit that, if it has been determined by the mobility range determination unit that there is an axis that exceeds the mobility range of the robot, rewrites the operation program so the axis is kept within the mobility range of the robot.

5 Claims, 6 Drawing Sheets

(56) References Cited

U.S. PATENT DOCUMENTS

| | | | |
|---|---|---|---|
| 2020/0139546 A1* | 5/2020 | Kerfeld | B25J 11/0055 |
| 2021/0001483 A1* | 1/2021 | Milenkovic | B25J 9/1666 |
| 2021/0308864 A1* | 10/2021 | Cassero | B25J 9/1666 |

FOREIGN PATENT DOCUMENTS

| | | | |
|---|---|---|---|
| JP | 2000-015593 A | 1/2000 | |
| JP | 2009-226561 A | 10/2009 | |
| JP | 2009-230552 A | 10/2009 | |
| JP | 2013-013922 A | 1/2013 | |
| JP | 2015-033745 A | 2/2015 | |
| JP | 2017-213668 A | 12/2017 | |

* cited by examiner

ROBOT CONTROL DEVICE

TECHNICAL FIELD

The present invention relates to a robot control device.

BACKGROUND ART

A robot that performs machining such as cutting and welding on a workpiece operates according to movement commands according to an operation program sent from a robot control device. In the operation program, commands for operating each of a plurality of drive axes of the robot are recorded for moving a tool tip of the robot to a taught position (for example, Patent Document 1: Japanese Unexamined Patent Application, Publication. No. 2017-213668).

Patent Document 1: Japanese Unexamined Patent Application, Publication. No. 2017-213668

DISCLOSURE OF THE INVENTION

Problems to be Solved by the Invention

When a robot is replaced with another robot (new robot) due to a reason such as aging, in order for the new robot to execute the same operations as those of the robot before the replacement (old robot), the operation program of the old robot may be loaded to a robot control device of the new robot. In the new robot after loading the operation program, an operator executes a teaching task using a teach pendant. Thereby, teaching points corresponding to the new robot are modified.

However, for example, when the size of the new robot is smaller than the size of the old robot, the operation program loaded into the new robot may include a position exceeding a mobility range of the new robot. When a position that cannot be reached by the tool tip of the robot s included in the operation program, the robot becomes inoperative. As a result, the operator cannot execute a teaching task for the robot. In this case, the operator needs to directly input a new operation program to the robot control device, which requires an extremely complicated task.

Therefore, it is desired to be able to make the robot operative without having the operator directly reinput an operation program, even when a robot is replaced with another robot of different size.

Means for Solving the Problems

One aspect of the present disclosure is a robot control device including: a storage unit that stores an operation program; and a control unit that operates a robot on a robot coordinate system with three orthogonal axes according to the operation program. The control unit includes: mobility range determination unit that determines, in the operation program, whether there is an axis exceeding a mobility range of the robot among the three orthogonal axes; and a modification unit that, when determined by the mobility range determination unit that there is an axis exceeding the mobility range of the robot, rewrites the operation program such that the axis comes within the mobility range of the robot.

Effects of the Invention

According to the one aspect, it is possible to provide the robot control device that is capable of making the robot operative without having the operator directly reinput an operation program, even when a robot is replaced with another robot of different size.

PREFERRED MODE FOR CARRYING OUT THE INVENTION

Figure 1:
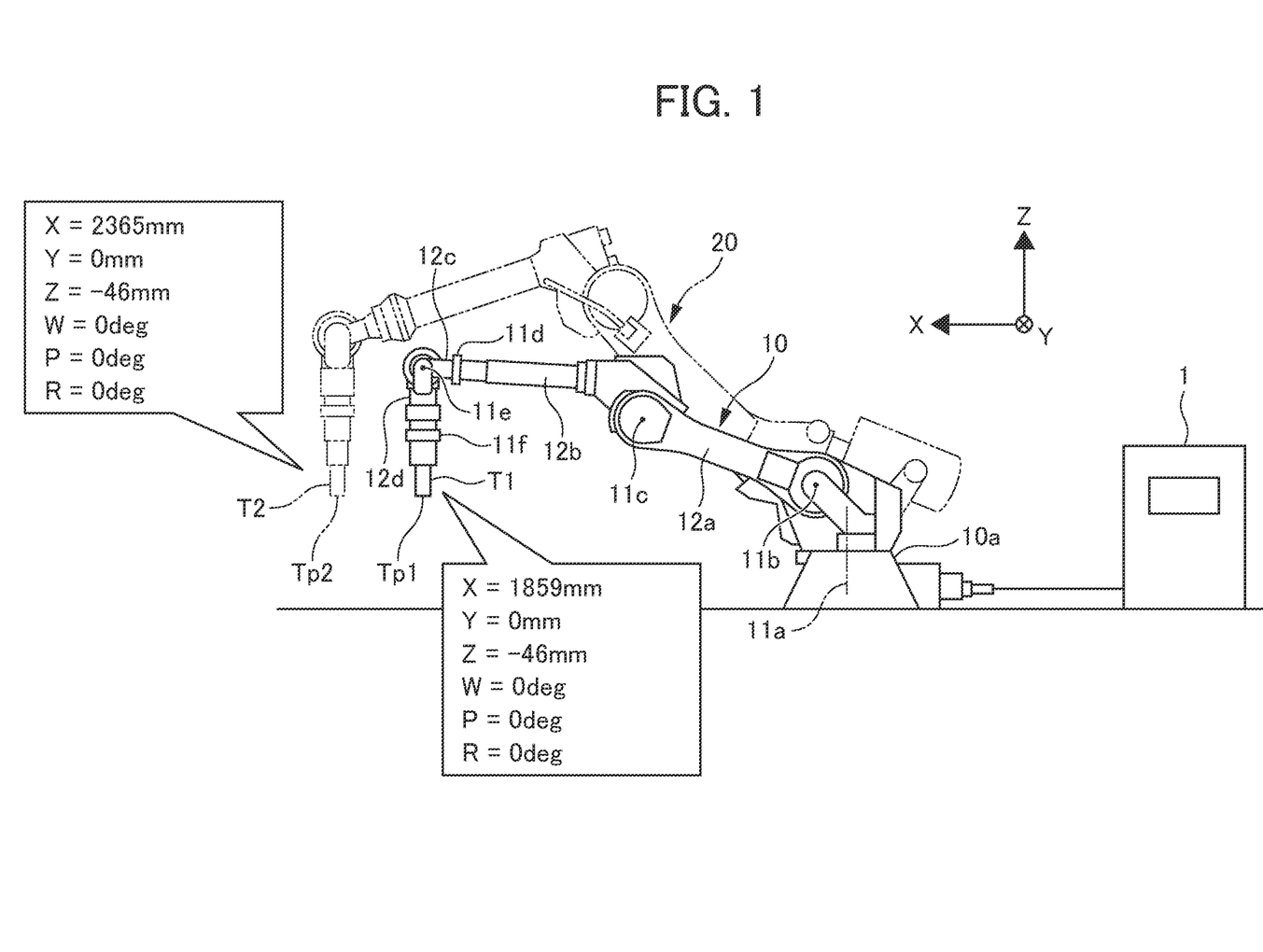
FIG. 1 is a configuration diagram showing a robot system.

Hereinafter, a robot control device according to an aspect of the present disclosure will be described with reference to the accompanying drawings. FIG. 1 shows a robot system that includes a robot control device 1. The robot system includes a robot 10 (new robot) that is connected to and drive-controlled the robot control device 1. The robot 10 is a robot that is replaced from a robot 20 (old robot) that is shown in FIG. 1 with a virtual line.

The robot 10 discussed in the present embodiment is an articulated robot that includes, on a base part 10a, a plurality of arm parts 12a to 12d that are rotatably connected via six drive axes 11a to 11f. A motor M (not shown in FIG. 1) is provided in each of the drive axes 11a to 11f. At a tip of the arm part 12d, a tool T1 is attached. The tool T is a cutting drill, a robot hand, a welding torch, or the like. Note that the robot 10 may simply need to be an articulated robot having a plurality of drive axes (joints), and it is not limited to the robot having the structure shown in FIG. 1.

Figure 2:
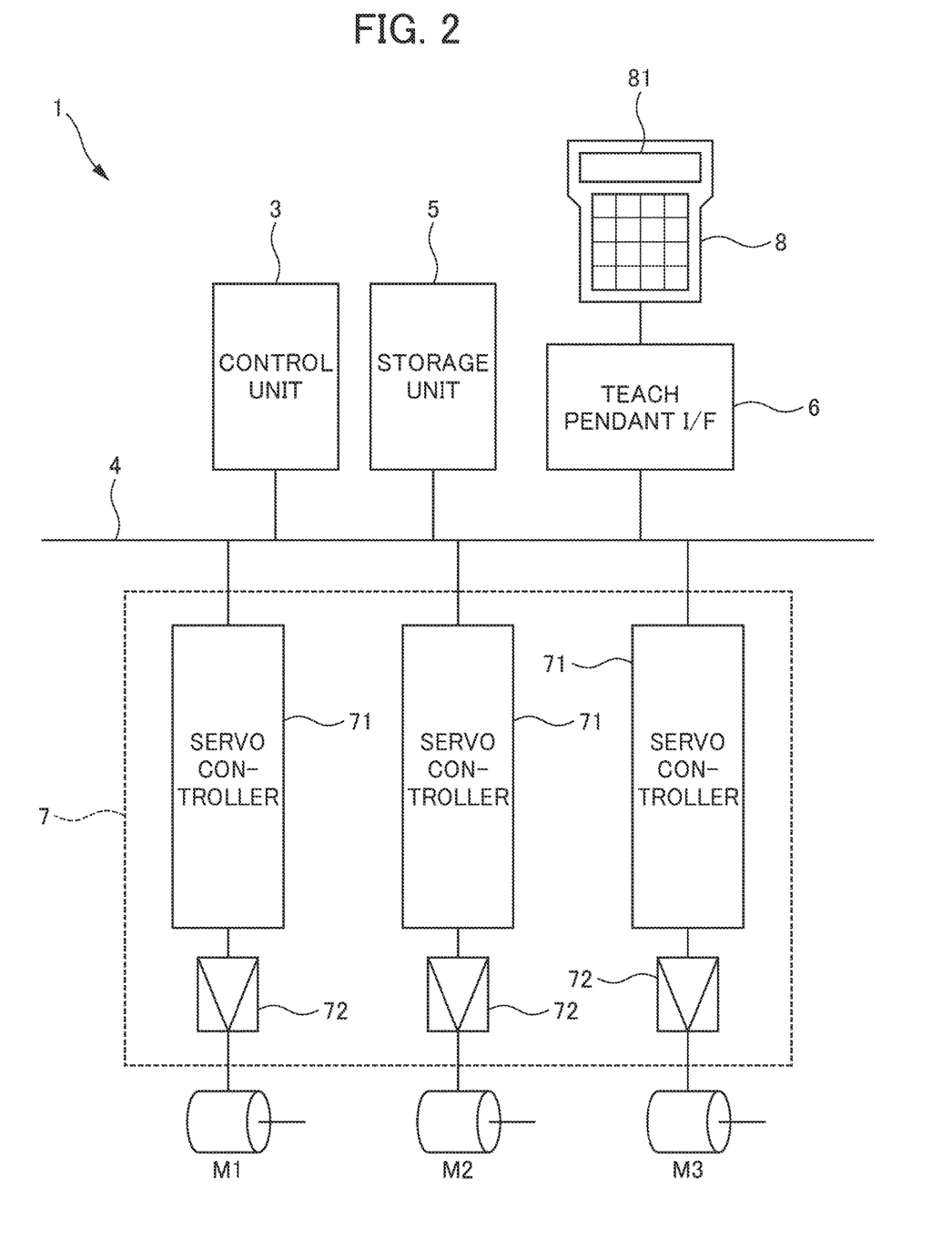
FIG. 2 is a block diagram showing a constitution of a robot control device.

In the robot 10, a robot coordinate system configured with three orthogonal axes of X axis, Y axis, and Z axis is set. The origin of the robot coordinate system is set at the base part 10a of the robot 10. In the robot 10, the left direction in FIG. 1 is +X axis direction and the right direction is −X axis direction with respect to the origin of the robot coordinate system. The depth direction with respect to the paper face of FIG. 2 is +Y axis direction, and the front direction with respect to the paper face is −Y axis direction. The upward direction in FIG. 1 is +Z axis direction, and the downward direction is −Z axis direction.

The size of the newly replaced robot 10 is smaller than the size of the robot 20 before the replacement. Therefore, the mobility range of the robot 10 in each of the X axis, Y axis, and Z axis directions is narrower than the mobility range of the robot 20 in each of the X axis, Y axis, and Z axis directions.

As shown in FIG. 2, the robot control device 1 includes: a control unit 3 configured with a CPU; and a storage unit 5, a teach pendant I/F 6, and a drive unit 7, which are connected in parallel to the control unit 3, respectively, via a bus 4.

In the storage unit 5, an operation program for operating the robot 10 is stored. This operation program is the operation program used in the robot 20, and it is kept in the storage unit 5 when the robot 20 is replaced with the robot 10.

In the storage unit 5, mobility range information specific to the robot 10 is further stored. The mobility range information specific to the robot 10 is information regarding a reachable range of the tip of the robot 10 (specifically, a tool tip Tp1) on the robot coordinate system, which is acquired by using the dimensional data of the robot 10 at the time of design (for example, spaces between each of the drive axes 11a to 11f, length of each of the arm parts 12a to 12d, and the like). The mobility range information of the robot 10 is expressed by stroke limit values of each of the X axis, Y axis, and Z axis on the robot coordinate system.

A teach pendant 8 including a display part 81 is connected to the teach pendant I/F 6 with wire or wirelessly. The operator can execute various operations such as teaching the robot 10 by manually operating the teach pendant 8.

The drive unit 7 is a servo drive unit that servo-controls each or the motors M for operating a plurality of drive axes 11a to 11f of the robot 10. The drive unit 7 includes a servo controller 71 and a servo amplifier 72 for each of the motors M. FIG. 2 shows three servo controllers 71 and servo amplifiers 72 corresponding to three motors M1, M2, and M3. However, the motor M, the servo controller 71, and the servo amplifier 72 are provided by corresponding to each of the drive axes 11a to 11f.

The control unit 3 reads out the operation program stored in the storage unit 5, and creates a movement command by arithmetic operation processing for robot control according to the operation program. The control unit 3 outputs the created movement command to the drive unit 7. The drive unit 7 upon receiving the movement command outputs torque commands to the servo amplifiers 72 via the servo controllers 71. The servo amplifiers 72 supply a current to the motors N corresponding to the drive axes 11a to 11f based on each of the torque commands to individually drive the respective drive axes 11a to 11f. In this manner, the robot 10 changes the pose in a various manner on the robot coordinate system.

Figure 3:
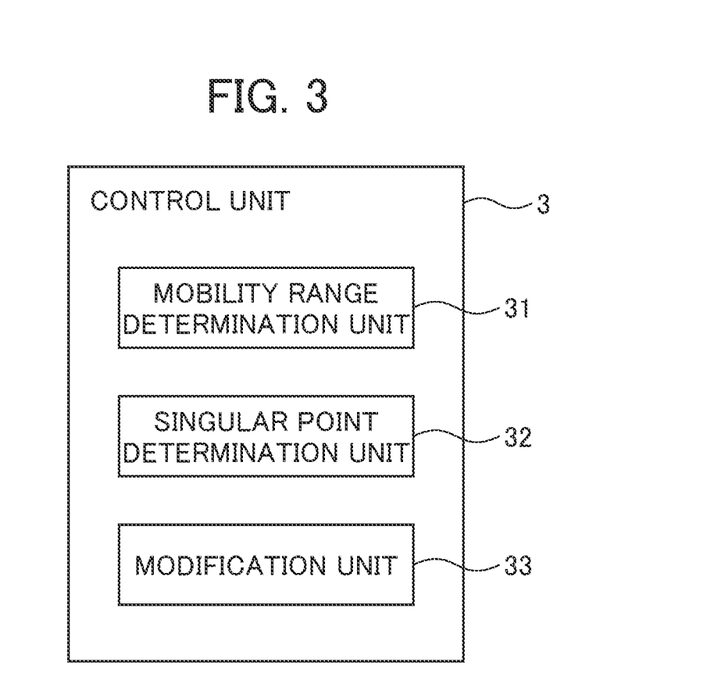
FIG. 3 is a block diagram showing a constitution of a control unit of the robot control device.

As shown in FIG. 3, the control unit 3 further includes a mobility range determination unit 31, a singular point determination unit 32, and a modification unit 33.

The mobility range determination unit 31 reads out the operation program stored in the storage unit 5, and determines, in the robot operations performed by the operation program, whether there is any axis exceeding the mobility range of the robot 10. Specifically, the mobility range determination unit 31 analyzes the operation program stored in the storage unit 5, and performs simulation of the operations of the robot 10 according to the operation program. In the simulation, the mobility range determination unit 31 refers to the movement commands according to the operation program and the stroke limit values of each of the X axis, Y axis, and Z axis of the robot 10 stored in the storage unit 5. In this manner, the mobility range determination unit 31 determines, in the robot operations performed by the operation program, whether there is any axis on the robot coordinate system exceeding the stroke limit values of the robot 10.

For example, as shown in FIG. 1, the robot 20 before the replacement can move a tool tip Tp2 to the position of 2365 mm in the +X axis direction. On the contrary, the newly replaced robot 10 can move the tool tip Tp1 only to the position of 1859 mm in the +X axis direction. That is, the stroke limit value of the robot 10 in the +X axis direction is 1859 mm. In this case, the mobility range determination unit 31 determines that the +X axis in the robot operation according to the operation program is the axis exceeding the stroke limit value of the robot 10.

The singular point determination unit 32 determines whether a singular point of the robot 10 is included in the robot operations performed by the operation program. A singular point is a three-dimensional position of the tool tip Tp1 of the robot 10, where it is difficult to uniquely determine the rotation angle and rotation speed of each of the drive axes 11a to 11f of the robot 10 by an inverse kinematics calculation from a movement command including a position command and a speed command.

Figure 4A:
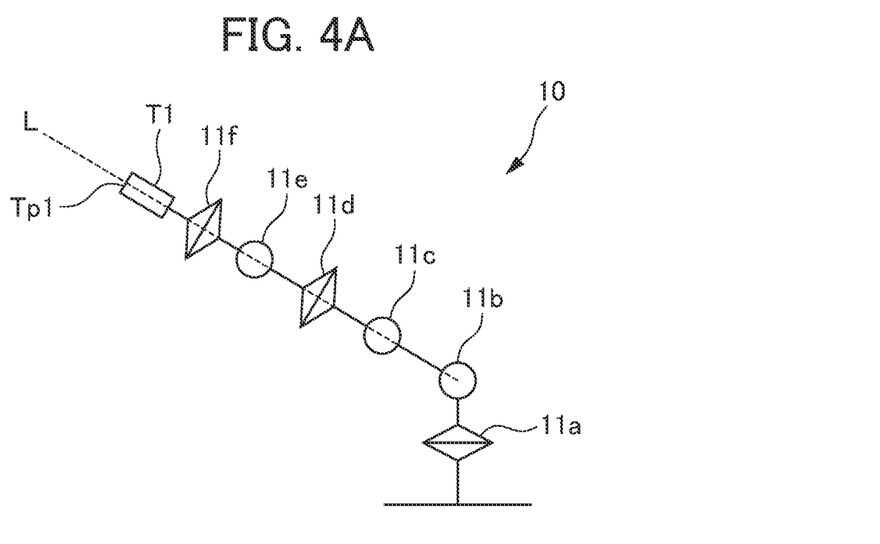
FIG. 4A is a schematic diagram of an example of a singular point of a robot.
Figure 4B:
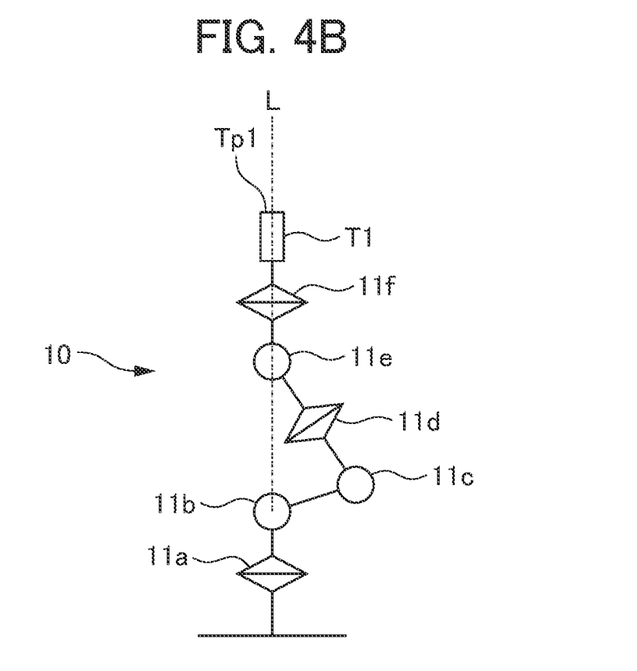
FIG. 4B is a schematic diagram of another example of a singular point of a robot.

The singular point will further be described with reference to FIG. 4A and FIG. 4B. In FIG. 4A and FIG. 4B, each of the drive axes 11a to 11f and the tool T1 of the robot 10 shown in FIG. 1 are schematically illustrated. As shown in FIG. 4A, in a case of a robot pose where the rotation center of the drive axis 11d and the rotation center of the drive axis 11f are on a same straight line L, the rotational movement of the tool T1 of the robot 10 about the axis can be performed by rotation of the drive axis 11d as well as by rotation of the drive axis 11f. As shown in FIG. 4B, in a case of a robot pose where the rotation center of the drive axis 11a and the rotation center of the drive axis 11f are on the same straight line L, the rotational movement of the tool T1 of the robot 10 about the axis can be performed by rotation of the drive axis 11a as well as by rotation of the drive axis 11f. Therefore, as for the three-dimensional positions of the tool tip Tp1 of the robot 10 to be in the robot postures illustrated in FIG. 4A and FIG. 4B, the rotation angle and rotation speed of each of the drive axes 11a to 11f of the robot 10 are not determined uniquely by an inverse kinematics calculation. Therefore, when the tool tip Tp1 is moved to the three-dimensional position where the rotation centers of two or more drive axes are on the same straight line and to the vicinity of such a position, the robot 10 may become inoperative.

The singular point determination unit 32 determines whether a singular point of the robot 10 is included in the operation program by actually operating the robot 10 to an operative range by the operation program. To include the singular point means not only the case where the robot pose completely matches the pose of the singular point but also a case where the robot comes to a pose close to the pose of the singular point, that is, a case where the robot 10 passes the vicinity of the singular point.

In order to determine whether a singular point is included in the operation program, the singular point determination unit 32 calculates, respectively, a plurality of positions (sampling points) where the tool tip Tp1 of the robot 10 may possibly pass, in the movement direction designated by the teach pendant 8 (for example, the X axis direction, a combined direction of the X axis direction and the Y axis direction, or the like). A plurality of sampling points calculated thereby are the positions (coordinates) on the robot coordinate system of the three orthogonal axes of the robot 10.

Specifically, the singular point determination unit 32 calculates the current position of the tool tip Tp1 of the robot 10 based on the rotation angles of each of the drive axes 11a to 11f acquired from the output values of encoders of the respective drive axes 11a to 11f of the robot 10. The current position can be acquired by a forward kinetics calculation. The singular point determination unit 32 calculates the sampling point at a prescribed period based on the calculated current position and the movement direction designated by the teach pendant 8. The prescribed period is a period extremely shorter than a generation period of the movement command of the robot 10.

The singular point determination unit 32 determines, among the drive axes 11a to 11f of the robot 10, whether there is a drive axis where it is difficult to acquire a solution of an inverse kinetics calculation for the position of the calculated sampling point so as to determine whether the sampling point is the singular point of the robot 10. Furthermore, even when a solution of an inverse kinetics calculation can be acquired, the singular point determination unit 32 can determine whether the sampling point is in the vicinity of the singular point of the robot 10 based on whether there is, among the drive axes 11a to 11f, a drive axis for which the motor cannot be controlled to follow the rotation angle of the solution. That is, the singular point of the robot 10 corresponds to the position of the tool tip Tp1 of the robot 10 where, as described above, a solution of an inverse kinetics calculation cannot be acquired. The vicinity of the singular point of the robot 10 corresponds to a position range of the tool tip Tp1 of the robot 10 where there may be a drive axis for which a desired motor control cannot be performed even if the solution of the inverse kinetics calculation can be acquired. Determination of the vicinity of the singular point can be performed by determining whether there is a sampling point within a zone acquired by adding a prescribed setting range from the position of the tool tip Tp1 that is determined to be the singular point of the robot 10.

The modification unit 33 rewrites the operation program stored in the storage unit 5 to a new operation program adapted to the robot 10, based on the determination results of the mobility range determination unit 31 and the singular point determination unit 32. The new operation program rewritten by the modification unit 33 is stored in the storage unit 5 as the new operation program for the robot 10.

Specifically, when is determined by the mobility range determination unit 31 that there is an axis exceeding the stroke limit value of the robot 10, the modification unit 33 rewrites the operation program such that the axis on the robot coordinate system comes within the stroke limit value. The value to be rewritten may be the stroke limit value or may be a value near the stroke limit value. The value near the stroke limit value is a value acquired by subtracting a preset value from the stroke limit value.

Furthermore, when it is determined by the singular point determination unit 32 that there is a singular point specific to the robot 10 or a vicinity of the specific point, the modification unit 33 replaces the operation form of the robot 10 with each of the axes on the robot coordinate system such that the singular point of the robot 10 or the vicinity of the singular point is not included in the operation program. For example, the modification unit 33 replaces the operation of the robot 10 in the X axis direction to an operation in the Y axis direction or the Z axis direction or to an operation in a combined direction of any two axes selected from the X axis, the Y axis, and the Z axis. Thereby, the robot 10 at the time of an operation can avoid having, among the drive axes 11a to 11f, at least two drive axes lined on the same straight line L, as illustrated in FIG. 4A and FIG. 4B. In this manner, the modification unit 33 rewrites the operation program such that the robot operation by the operation program does not correspond to the singular point specific to the robot 10, that is, the robot 10 does not pass the singular point or the vicinity of the singular point.

Next, the specific control of the robot control device 1 will be described by referring to flowcharts. After the robot 20 is replaced with the robot 10, the control unit 3 of the robot control device 1 first executes mobility range determination processing by the mobility range determination unit 31 and, thereafter, executes singular point determination processing by the singular point determination unit 32.

Figure 5:
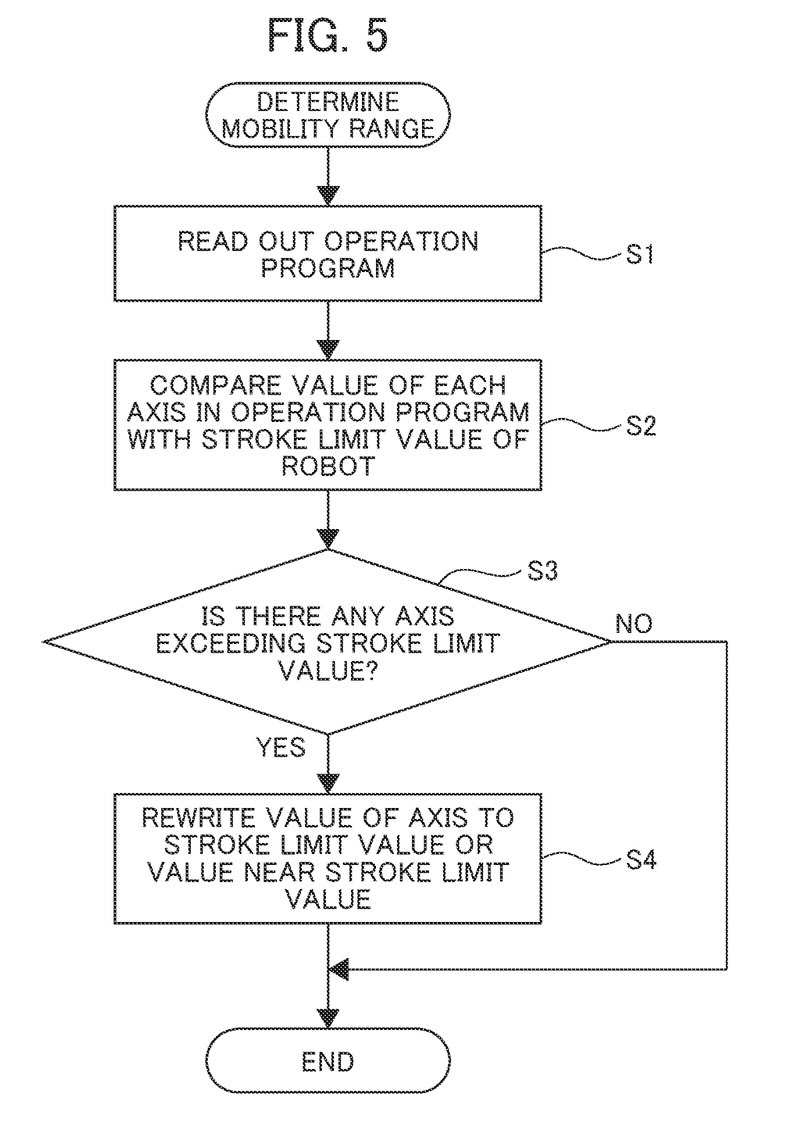
FIG. 5 is a flowchart showing a control operation of the robot control device.

The mobility range determination processing is illustrated in FIG. 5. In the mobility range determination processing, the control unit 3 reads out the operation program of the robot 20 stored in the storage unit 5 (Step S1). Then, the control unit 3 analyzes the read-out operation program by the mobility range determination unit 31 to compare the movement commands for each of the axes of the robot 10 according to the operation program with the stroke limit values of each of the axes of the robot 10 stored in advance in the storage unit 5 (Step S2). By this comparison, the mobility range determination unit 31 determines whether there is an axis exceeding the stroke limit value of the robot 10 included in the movement commands for each of the axes of the robot 10 according to the operation program (Step S3).

When determined in Step S3 that there is an axis exceeding the stroke limit value of the robot 10 (Yes in Step S3), the control unit 3 uses the modification unit 33 to rewrite the value of the axis in the operation program to the stroke limit value of the robot 10 or a value near the stroke limit value (Step S4). The control unit 3 temporarily stores the new operation program rewritten by the modification unit 33 to a prescribed zone of the storage unit 5, and shifts to the singular point determination processing.

When determined in Step S3 that there is no axis exceeding the stroke limit value of the robot 10 (No in Step S3), the control unit 3 shifts to the singular point determination processing without rewriting the operation program by the modification unit 33.

Figure 6:
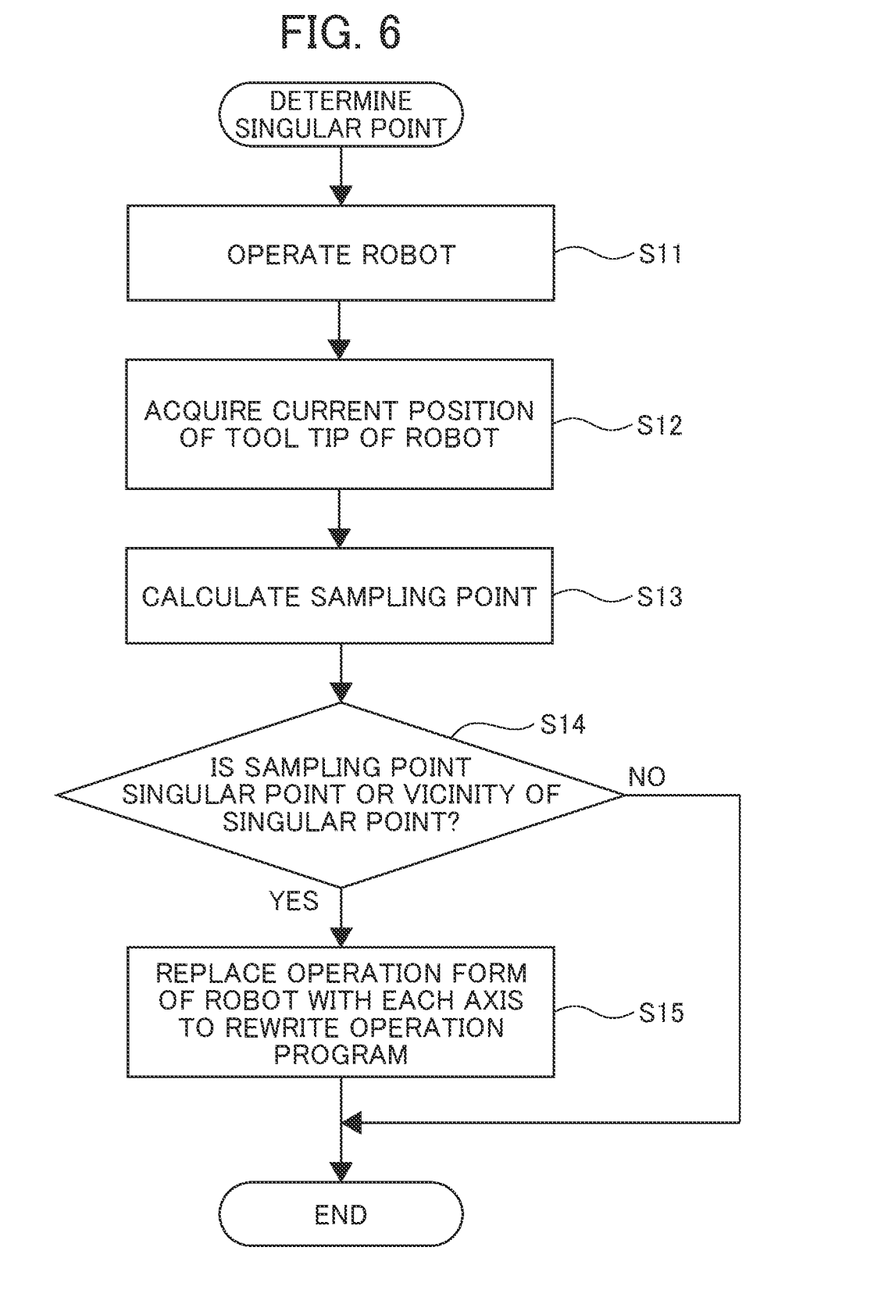
FIG. 6 is a flowchart showing a control operation of the robot control device.

The singular point determination processing is illustrated in FIG. 6. In the singular point determination processing, the control unit 3 operates the robot 10 to its operative range according to the movement command from the teach pendant 8 (Step S11). The singular point determination unit 32 acquires the current position of the tool tip Tp1 of the robot 10 from the rotation angles of each of the drive axes 11a to 11f of the robot 10 by a forward kinetics calculation (Step S12).

Then, the singular point determination unit 32 calculates each of a plurality of sampling points on the robot coordinate system where the tool tip Tp1 of the robot 10 may possibly pass (Step S13). Thereafter, as described above, the singular point determination unit 32 determines, among the drive axes 11a to 11f of the robot 10, whether there is a drive axis where it is difficult to acquire a solution of an inverse kinetics calculation for the position of the calculated sampling point or, among the drive axes 11a to 11f of the robot 10, whether there is a drive axis for which the motor cannot be controlled to follow the rotation angle of the solution of the inverse kinetics calculation so as to determine whether the sampling point is a singular point of the robot 10 or the vicinity of the singular point (Step S14).

When determined in Step S14 that the sampling point is the singular point of the robot 10 or the vicinity of the singular point (Yes in Step S14), the control unit 3 uses the modification unit 33 to replace the operation form of the robot 10 with each of the axes on the robot coordinate system so as not to correspond to the singular point. In this manner, the modification unit 33 rewrites the operation program such that the singular point of the robot 10 or the vicinity of the singular point is not included (Step S15). Thereafter, the control unit 3 ends the processing.

When determined in Step S14 that the sampling point is not the singular point of the robot 10 or the vicinity of the singular point (No in Step S14), the control unit 3 ends the processing without replacing the operation program.

As described above, the robot control device 1 according to one aspect of the present disclosure includes: the storage unit 5 that stores an operation program; and the control unit 3 chat operates the robot 10 on the robot coordinate system with three orthogonal axes according to the operation program. The control unit 3 includes: the mobility range determination unit 31 that determines, in the operation program, whether there is an axis exceeding a mobility range of the robot 10 among the three orthogonal axes; and the modification unit 33 that, when determined by the mobility range determination unit 31 that there is an axis exceeding the mobility range of the robot 10, rewrites the operation program such that the axis comes within the mobility range of the robot 10. This makes it possible to automatically rewrite the operation program to the new operation program adapted to the robot 10, when the robot 20 is replaced with the new robot 10 of different size. Therefore, it is possible to make the robot operative without having the operator directly re-input the operation program.

In the robot control device 1 of the present embodiment, when determined by the mobility range determination unit 31 that there is an axis exceeding the mobility range of the robot 10, the modification unit 33 rewrites a value of the axis in the operation program to a stroke limit value of the robot 10 or a value near the stroke limit value. Thereby, it is possible to easily rewrite the value of the axis exceeding the mobility range of the robot 10 in the operation program to a value within the mobility range of the robot 10.

In the robot control device 1 of the present embodiment, the control unit 3 further includes the singular point determination unit 32 that determines whether a singular point of the robot 10 is included in the operation program, and when determined by the singular point determination unit 32 that a singular point of the robot 10 is included, the modification unit 33 rewrites the operation program such that the singular point is not included. Thereby, in the operation of the robot according to the operation program, it is possible to avoid the robot 10 passing the singular point.

In the robot control device 1 of the present embodiment, when determined by the singular point determination unit 32 that a singular point of the robot 10 is included, the modification unit 33 replaces an operation form of the robot 10 in the operation program with each of the axes on the robot coordinate system to rewrite the operation program such that the singular point is not included. Thereby, it is possible to easily avoid the robot 10 passing the singular point.

EXPLANATION OF REFERENCE NUMERALS

1 Robot control device
3 Control unit
31 Mobility range determination unit
32 Singular point determination unit
33 Modification unit
5 Storage unit
10 Robot

The invention claimed is:

1. A robot control device comprising:
a control unit that operates a robot on a robot coordinate system with three orthogonal axes according to an operation program; and
a storage unit that stores a first operation program for a first robot, wherein
the control unit includes:
a mobility range determination unit that determines, in the first operation program read from the storage unit, whether there is an axis exceeding a mobility range of a second robot that is different in size from the first robot among the three orthogonal axes; and
a modification unit that, when determined by the mobility range determination unit that there is an axis exceeding the mobility range of the second robot, rewrites the first operation program such that the axis comes within the mobility range of the second robot.

2. The robot control device according to claim 1, wherein, when determined by the mobility range determination unit that there is an axis exceeding the mobility range of the second robot, the modification unit rewrites a value of the axis in the first operation program to a stroke limit value of the second robot or a value near the stroke limit value.

3. The robot control device according to claim 1, wherein the control unit further includes a singular point determination unit that determines whether a singular point of the second robot is included in the first operation program, and
when determined by the singular point determination unit that a singular point of the second robot is included, the modification unit rewrites the first operation program such that the singular point is not included.

4. The robot control device according to claim 3, wherein, when determined by the singular point determination unit that a singular point of the second robot is included, the modification unit replaces an operation form of a robot in the first operation program with each of the axes on a robot coordinate system for the second robot to rewrite the first operation program such that the singular point is not included.

5. The robot control device according to claim 1, wherein the modification unit stores the first operation program after being rewritten in the storage unit as an operation program for the second robot.

* * * * *